Aug. 14, 1962  J. KATONA  3,049,049
MOTION PICTURE APPARATUS
Filed Oct. 28, 1959  6 Sheets—Sheet 1

Joseph Katona,
Inventor.
Koenig and Pope,
Attorneys.

Aug. 14, 1962 J. KATONA 3,049,049
MOTION PICTURE APPARATUS
Filed Oct. 28, 1959 6 Sheets-Sheet 5

Aug. 14, 1962  J. KATONA  3,049,049
MOTION PICTURE APPARATUS
Filed Oct. 28, 1959  6 Sheets-Sheet 6

Joseph Katona,
Inventor.
Koenig and Pope,
Attorneys.

shown in elevation;

United States Patent Office 3,049,049
Patented Aug. 14, 1962

3,049,049
MOTION PICTURE APPARATUS
Joseph Katona, Clintonville, Wis. (% Paradynamics, Incorporated, 9621 Manchester Road, St. Louis, Mo.)
Filed Oct. 28, 1959, Ser. No. 849,357
22 Claims. (Cl. 88—16.8)

This invention relates to motion picture apparatus and with regard to certain more specific features to a method of and apparatus for motion picture photography employing serial frame type motion picture film, either for picture projection or for picture taking.

Among the several objects of the invention may be noted the provision of apparatus and a method for motion picture photography in which the film moves continuously rather than interruptedly and in which no substantially light-interrupting shutter is employed; the provision of apparatus of this type in which the light efficiency of the projection beam is substantially greater than is obtained with a conventional shutter; the provision of apparatus of the class described capable of high-quality performance over a wide range of film speeds, including presently substandard speeds, without flicker in the case of projection; the provision of apparatus of the class described in which wear on the film is at a minimum so that the film can be used repeatedly for projection without the deterioration formerly expected in the quality of performance; the provision of apparatus of this class with which there is no inherent limit to the film size which may be used and with which it is possible to use less costly, thinner and therefore more transparent film; the provision of apparatus of this class having less wear, vibration and noise of its mechanism, the accelerations and decelerations of which are very small, whereby steadier pictures are obtained upon projection and, in the case of film having a sound track, whereby sound is better reproduced because of elimination of film vibration which would otherwise require damping; and the provision of apparatus of the class described adapted conveniently to compensate for film shrinkage. Other objects and features will be in part apparent and in part pointed out hereinafter.

The invention accordingly comprises the steps and sequence of steps, elements and combinations of elements, features of construction, and arrangements of parts which will be exemplified in the structures and methods hereinafter described, and the scope of which will be indicated in the following claims.

In the accompanying drawings, in which several of various possible embodiments of the invention are illustrated.

Corresponding reference characters indicate corresponding parts through the several views of the drawings.

By way of example and not limitation, the description hereinafter will relate to a film projector and to silent type, standard-size film to be projected, at a rate of 24 frames per second. It will be understood that other nonstandard film sizes may be used, that the use of sound type film and associated apparatus for its use is not precluded, and that the principles of the invention are applicable to cameras for taking pictures on unexposed film, as well as for projection. It is also applicable to cinemascope type of projection.

Ordinary motion picture taking and projection are usually accomplished by intermittently moving film into fixed position across a film gate with respect to which a projection beam is transmitted. While the film is moving the beam is intercepted, but the beam is reinstated during the periods in which successive frames of the film are stationary in the gate. Thus, for example, on a projection screen one complete projected standing image (from one frame on the film in a projection gate) is succeeded by another complete projected standing image (from a succeeding frame in the gate), the screen being deprived of light between projections. The result is considerable loss of light from the beam and the introduction of flicker, which becomes particularly noticeable at low projection speeds.

Since the film must be accelerated and decelerated during the period that the beam is interrupted, considerable noise and vibration also result, along with machine and film wear and tear, particularly upon the sprocket holes employed in the film. This again results in damage to the quality of the performance. Also, the process is restricted to smaller film sizes employing comparatively thick and strong film material because larger films are more difficult to accelerate and decelerate without damage thereto.

The above and other disadvantages of this former system are avoided by means of the present invention.

Figure 1:
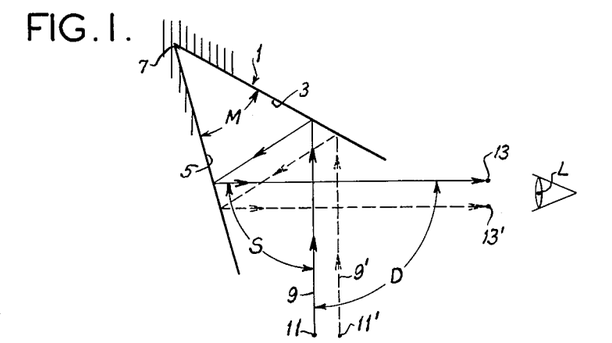
FIG. 1 is a line diagram illustrating certain optical effects associated with angle mirrors such as constitute elements of the invention.
Figure 2:
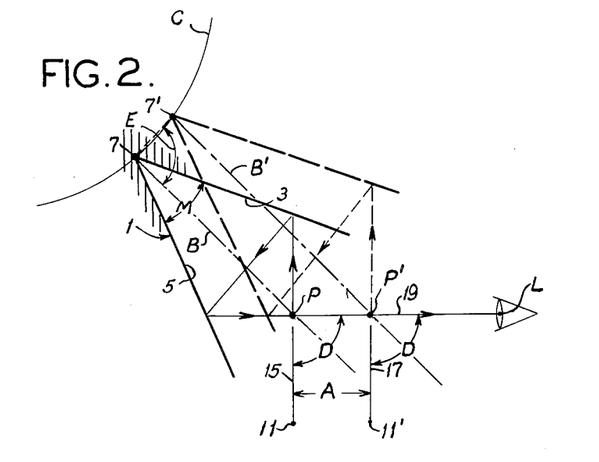
FIG. 2 is a line diagram illustrating certain optical effects of angle mirrors such as shown in FIG. 1 when moved in a manner substantially according to the invention.

Before proceeding with a description of the apparatus employed, reference is made to FIGS. 1 and 2 wherein certain optical effects of angle mirrors applicable to the invention are illustrated. Referring more particularly to FIG. 1, there is shown at numeral 1 an angle mirror. This consists of two reflecting mirrors 3 and 5 which are fixedly joined. The intersection line between their planes of reflection appears at 7 normal to the paper. This may be referred to as the dihedral line of any angled mirror such as 1. The dihedral line need not be physically embodied and may be ideal in the sense that it represents the intersection of two planes. Thus an angle mirror may be defined herein as one having rigidly related reflecting surfaces which face one another across an angle of less than 90°. It will be understood that in FIGS. 1 and 2 the planes of the mirrors 3 and 5 also extend normally to the paper. The mirrors are preferably reflectively surface-coated on the inside of their included angle M, hereinafter called the mirror angle.

At 9 is indicated a single ray of light proceeding from a point source 11 and directed toward the angle mirror 3, 5. This, by double reflection, reflects at an angle D to a point 13, for example. The reflection angle D is independent of the mirror position. The supplement of the reflection angle D is indicated at S. It can be mathematically shown that the angle M is always one-half of the supplemental angle S. Hence the reflection angle D is a function only of the angle M. In the present example, the angle M is 45°; hence angles S and D are each equal to 90°. If, for example, the angle M were 30° then the supplemental angle S would be 60° and the reflection angle D would be 120°. The 45° angle M is preferred but it will be understood that other angles can be used in apparatus wherein such other angles might admit of a more advantageous disposition of parts. If the beam source point 11 is moved to position 11' then, as shown in FIG. 1, a new light ray 9' is established and the point 13 will become located as at 13' on a different line of reflection. Thus to an observer at L it appears to move. These comments concern a nonmoving mirror.

In FIG. 2 is illustrated a condition of translatory plane movement of the angle mirror 1 from a solid- to a dashed-line position, in which its dihedral line 7 moves to point 7' over a straight line 7—7'. In this case a point 11 (assumed to be in a picture in a plane perpendicular to the paper) is presumed to move with the picture to 11'. For example, this point 11 might be one point in a picture constituting one frame of motion picture film located in a plane perpendicular to the paper, the film and its picture moving to the right, so as to transpose the selected point 11 in the image to 11'. Then a ray 15, extending through P to the mirror 1 in its initial solid-line position, would be reflected 90° to a viewer at station L (for example). If during the movement from 11 to 11' (assumed to be at constant speed) the mirror 1 is moved such that its intersection line moves on the straight line 7 to 7' at constant speed, a ray 17 will likewise be angled 90° toward the station L, passing through P'. In this case, unlike that shown in FIG. 1, the mirror exit portions 19 of both rays 15 and 17 are coincident. Therefore, the point 11 of the point field on the moving film will appear at L to be stationary. The same is true of any other point in the picture field on the film. Thus as to any complete picture on any film that may be moved at constant speed over the distance A, any selected point in its image does not appear to move. Consequently, any image of the entire picture formed at station L will appear as a standing image with no relative motion of it with respect to surrounding fixed objects and without motion of any point therein with respect to any other point therein.

It will be seen from the above that a line attached to the mirror structure such as B drawn from 7 to P will be parallel in the position 7'—P'. Lines 7—P and 7'—P' bisect angle D. The length of line 7—7' required to be traversed by point 7 in a unit of time is determined by the length of line P—P' produced in the same unit of time. Also, the ratio of movements along 7—7' and P—P' should be constant. Therefore if the velocity along line P—P' is constant the velocity along line 7—7' should be constant.

In order to obtain at station L the appearance of a perfectly stationary standing image, it is necessary that the line 7—7' shall be straight; or, if insufficiently straight, that suitable corrective measures be taken to correct resulting faults in the projected image. If the station L is occupied by a seeing eye, then to prevent the scene from appearing to advance and retract, the distance along the total length of the reflected beam from 11 to L (as shown by the darts) should equal the distance along the reflected beam 11'—L (also as shown by darts along the dotted lines). This constancy of distance can be maintained only when 7—7' is perpendicular to line 7—P in the example given. In general, the angle E should be 2M. If the direction 7—7' is other than above stated, then to the eye the scene will appear to advance and retract. If a projection lens is substituted for an eye at L, then in order to maintain a sharp image in the plane of the scene, said distances 11—L and 11'—L must remain constant where L is any given point in the lens.

Fairly good results can be obtained when the path 7—7' sufficiently approximates a straight line. A form of projector built with such an approximation has a very simple arrangement which will therefore be described first in connection with the showing in FIGS. 3, 4, 5 and the respectively coordinated FIGS. 3A, 4A and 5A. While such a projector does not give as high a quality of image projection as the form of the invention described in connection with FIGS. 6–13, it is sufficient for some purposes and partakes of most of the advantages of the invention. Such a projector will first be described, since among other things it more simply exhibits basic features. Thereafter a form of the invention will be described employing corrective features for maximum excellency of performance.

Figure 3:
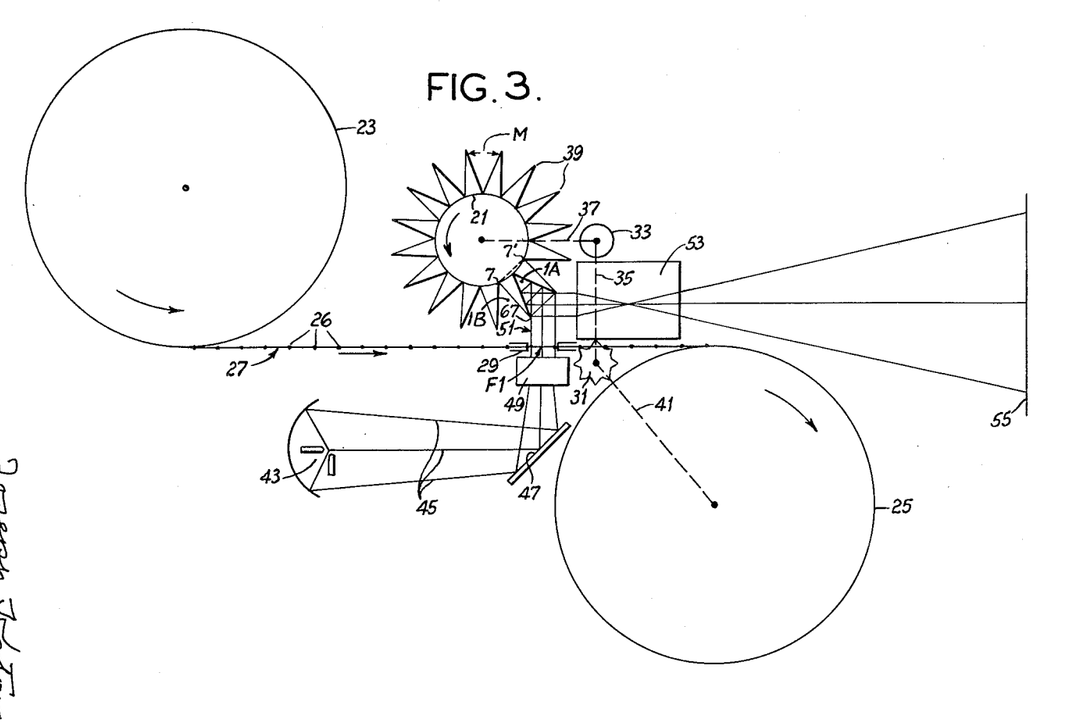
FIG. 3 is a diagrammatic view illustrating one form of the invention and certain general principles of operation, a selected leading full picture frame being under projection.
Figures 3A, 4, 4A, 5, 5A:
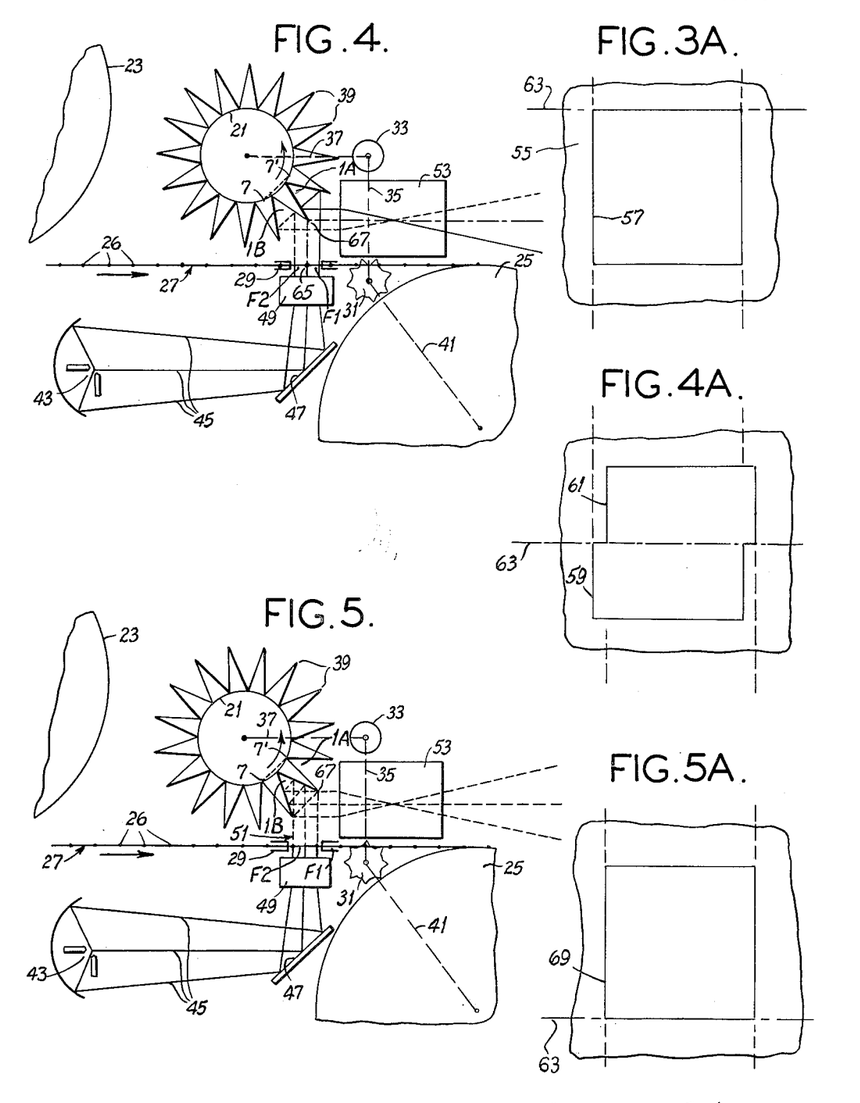
FIG. 3A is a diagram of an arbitrary square image in a hypothetical scene as projected in the FIG. 3 positions of parts.
FIG. 4 is a fragmentary view similar to certain parts of FIG. 3, moved to positions in which only the rear part of a selected leading frame and a fore part of a next trailing full frame are under conjoint projection.
FIG. 4A is a view similar to FIG. 3A but showing a changing square image as conjointly projected according to the FIG. 4 positions of parts.
FIG. 5 is a view similar to FIG. 4, in which a full trailing picture frame is under projection.
FIG. 5A is a diagram of a displaced square image projected by the FIG. 5 positions of parts.

In the form of the invention shown in FIGS. 3–5, each angle mirror such as 1 is moved in a rotary manner such that the path 7, 7' of FIG. 2 is approximated by a small portion of an arc drawn for purpose of illustration and labeled C in FIG. 2. It is apparent that over the span 7—7' the path along the arc deviates very slightly from the path along the straight line 7—7', particularly for arcs of comparatively large radii. The arc C forms the basis for the circular outline of a rotatable cylinder or drum 21 shown in FIGS. 3–5, around the periphery of which sixteen angle mirrors are rigidly radially mounted in a peripheral sequence, preferably with each mirror angle M symmetrically disposed with respect to a radial line from the center of the drum 21, all radial lines being equally spaced.

A sequence of two selected mirrors are lettered 1A and 1B in FIGS. 3, 4 and 5, these being the two angle mirrors that are in a projective sequence in said figures. At numeral 23 is illustrated a film supply drum, and at numeral 25 a film take-up or winding drum for moving a strip of film 27 at a constant velocity through a film gate 29. The dots 26, arbitrarily indicated on the film 27, identify the picture frame spacing thereon. The opening in the gate 29 approximately matches the outline of one film picture frame. At 31 is diagrammatically illustrated a sprocket for driving the film 27 by meshing with the usual perforations therein. Actually it is desirable that the film have arcuate contact with the sprocket 31 and such contact is readily attainable as is known to those skilled in the art. This sprocket is driven from a prime mover 33 at any desired constant speed. A drive therefor from prime mover 33 is diagrammatically illustrated at 35. The drum 21 is also driven from the prime mover 33 by a constant speed drive 37. Both of the drives 35 and 37 are of the positive type and positively coordinate the speeds of the sprocket 31 and drum 21, such that the margins 39 between adjacent abutting angle mirrors have a constant speed ratio with respect to the constant speed of the film 27 passing through the gate 29. The angle mirrors are so constructed that these margins are as narrow as it is practical to make them. Hence in traversing a light beam, they occult the beam substantially imperceptably. A conventional slip drive, indicated diagrammatically at 41, is employed to transmit movement from the sprocket 31 to the take-up drum 25. It will be noted that no slack loops are essential in the strip of film 27.

At numeral 43 is shown a source for a light beam 45 which, through a conventional mirror 47, is reflected into a condenser lens 49 to produce a beam of light 51 having substantially parallel rays entering into the angle mirrors as they successively move from left to right. Since the mirrors are of the 45° variety, the beam will be reflected at a right angle into a projection lens lettered 53. Lens 53 focuses an image on a screen 55 of whatever picture frame or frames are passing through the gate 29. This, in view of the principles above set forth, will be a standing or stationary image. It will be understood that the mirror 47 may not be necessary in cases wherein the light source 43 may be conveniently located entirely in line with the condenser 49. Nor is the condenser necessary if the beam consists of rays proceeding in the proper direction.

Referring to FIGS. 3–5 and 3A–5A, operation is as follows, assuming that the film 27 is moving at constant speed from left to right, as shown by the darts, and assuming that for the small angular movement of each angle mirror while passing through projective positions only a small amount of deviation from a straight line is experienced by the dihedral lines 7 of the angle mirrors. Picture frames pass through the gate with the upper parts of their scenes foremost or leading and the lower parts rearmost or trailing.

In FIG. 3, angle mirror 1A is in such a position opposite the condenser 49 as to accept all of the rays of the beam passing through the gate 29, one whole picture frame F1 being in the gate. The entire bundle of rays constituting the beam is thus reflected into the lens 53, which inverts the rays and with proper focusing at lens 53 projects an upright stationary or standing image on the screen 55, although the film is moving. An image on the screen 55 of a square object of the picture in frame F1 is numbered 57 in FIG. 3A.

In FIG. 4, angle mirror 1A has advanced at a constant speed so as to accept only the right half of the beam through gate 29, which half of the beam is passing through the rear or trailing part of the receding frame. This corresponds to the lower part of the scene on this receding frame. Thus the lower parts 59 of the projection remain in place, as shown in FIG. 4A. In the meantime, the succeeding angle mirror 1B has moved into the left half of the beam, as FIG. 4 shows by broken lines. This beam is passing through the right half of the next succeeding frame F2 of the film, which half is then in the gate 29. This corresponds to the upper portions of the scene in this succeeding frame which projects in displaced position, as shown at 61 in FIG. 4A. It is to be remembered in this respect that the picture in each succeeding frame has in the taking thereof been offset with respect to the picture in the preceding frame. The offset separating line is shown at 63 in FIG. 4A. This line moves downward.

It will be understood that portions 61 and 59 are stationary standing images, the one (61) increasing the extent of its area downward at a constant rate (FIG. 4A) and replacing the other (59), which is decreasing the extent of its area at the same rate. The dividing line 63 between scene sections 61 and 59 is determined by the edge 67 between adjacent mirrors such as 1A and 1B. This edge 67 is in moving vertical substantially projective relationship to a dividing line 65 between frames F1, F2.

In FIG. 5, angle mirror 1B has fully replaced mirror 1A in the beam at the same time that the frame F2 has completely replaced frame F1 in the beam, the dividing line 65 having passed out of the gate 29. Correspondingly, line 63 has moved downward (FIG. 5A), causing a complete new and displaced standing image 69 to be projected, as shown in FIG. 5A. The light rays of the beam in FIG. 3 passing through frame F1 and reflected by the angle mirror 1A are all shown by solid lines. In FIG. 4, the part of the beam passing through the left-hand part of preceding frame F1 and the angle mirror 1A are bounded by a dotted line and a central dot-dash line, the left-hand part of the beam passing through the right-hand part of frame F2, being bounded by a solid line and this central dot-dash line. This signifies that the beam which produces the split image of FIG. 4A is projecting as standing partial images parts of two different frames and the scenes thereon. In FIG. 5, the beam passing through the succeeding frame F2 and reflected by the angle mirror 1B is indicated by dotted lines.

It will be observed that the method of obtaining the illusion of motion is not the conventional one of replacing one whole standing image after an interval of darkness by another whole standing image. Rather it consists in progressively wiping out one standing image and gradually replacing it with another growing standing image without any substantial intervening interval over which there is no picture projected. The only interference of the light beam is that due to the substantially undetectable dividing or parting line 65 between frames in line with the narrow edge 67 between angle mirrors such as 1A and 1B. This line virtually cannot be seen in its sweep, and remains comparatively invisible even at much lower than standard film speeds. At all speeds flicker is avoided. In conventional projection, the necessary persistence of vision at low projection speeds cannot carry through the long periods of darkness, which causes the sensation of flicker. According to the present invention this is not the case.

Referring now to FIGS. 6–13, these show a form of the invention designed to cause the trajectory of the dihedral line 7 of each angle mirror to follow a straight-line path 7—7', such as illustrated in FIG. 2, rather than an arc C such as shown in that figure. The position of this line is also indicated at 7—7' in FIGS. 6 and 8.

Figure 6:
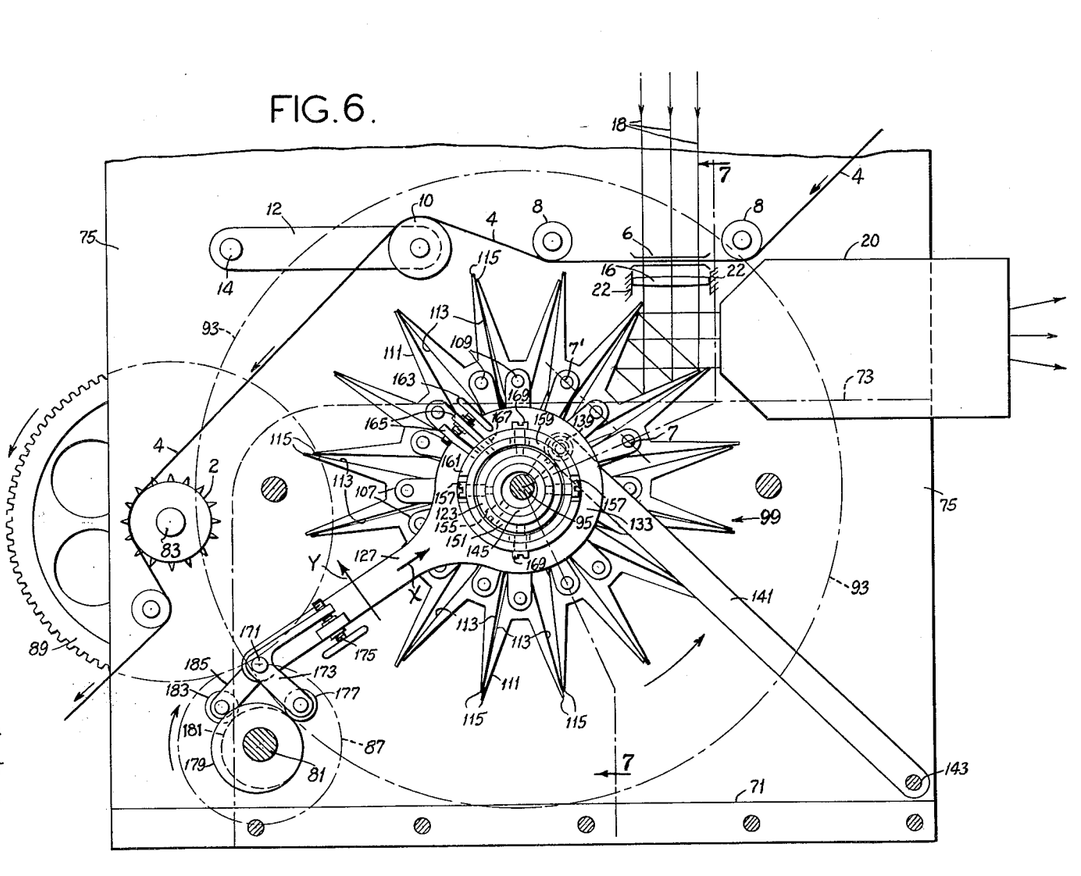
FIG. 6 is a side view of an alternative form of the invention with a front side wall and a bracket removed, being viewed approximately on line 6—6 of FIG. 7.
Figures 7, 9, 10, 11:
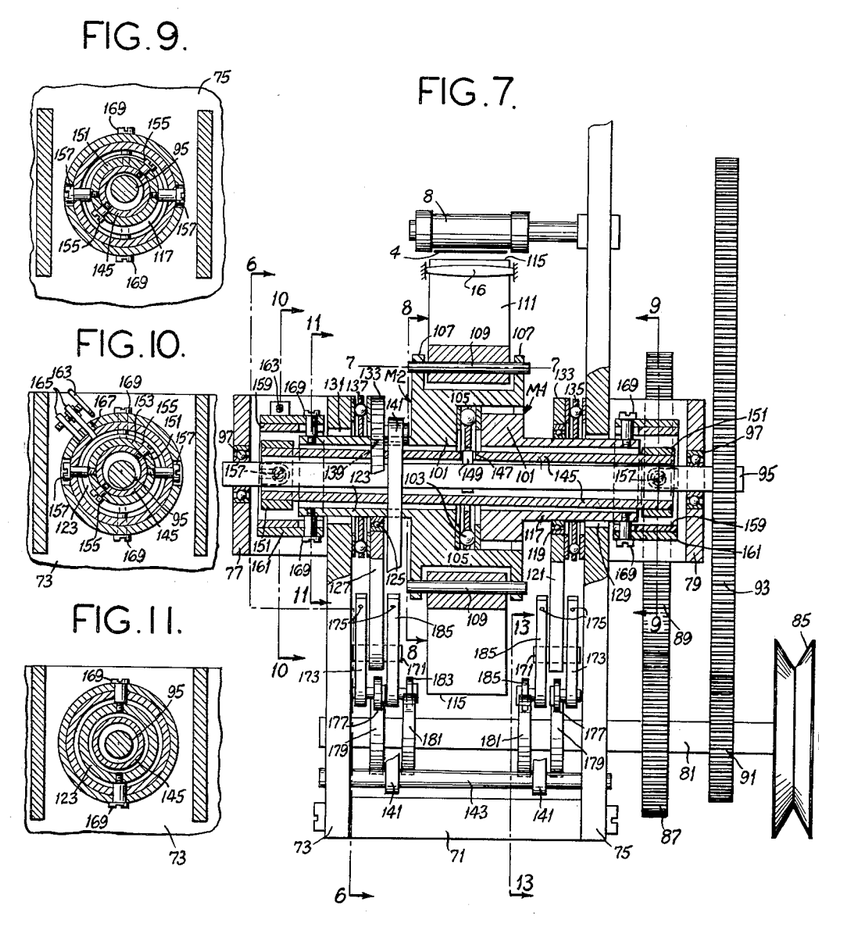
FIG. 7 is an ideal cross section of the alternative form, taken approximately on line 7—7 of FIG. 6, parts being shown in elevation.
FIGS. 8, 9, 10 and 11 are cross sections taken on lines 8—8, 9—9, 10—10 and 11—11, respectively, of FIG. 7.
Figures 8, 12, 13:
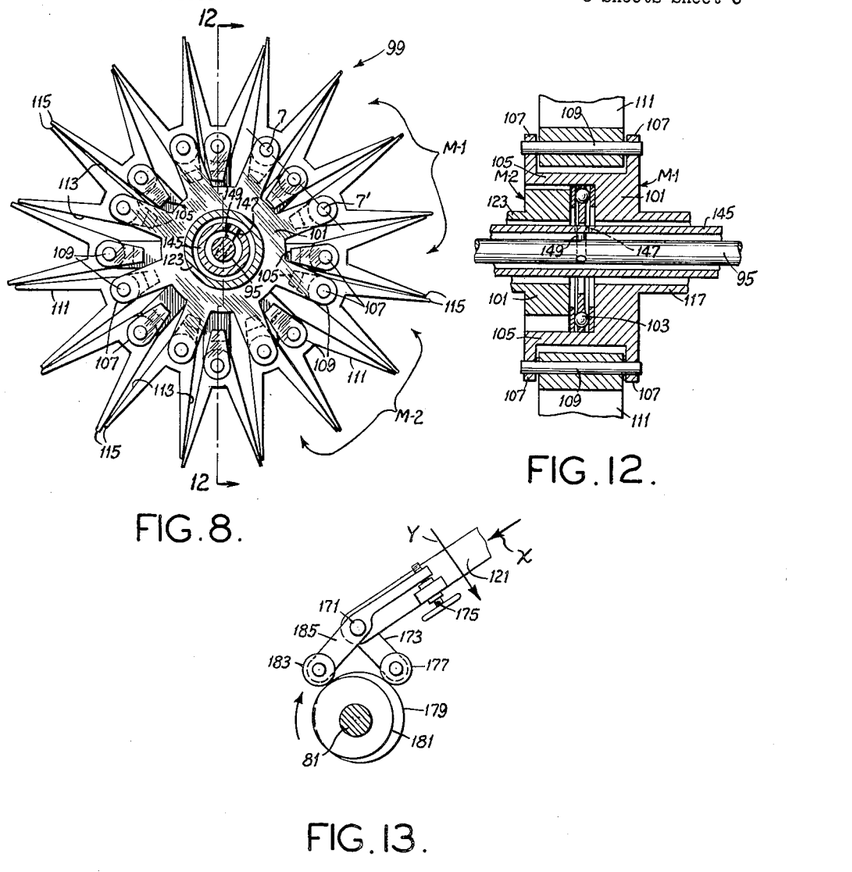
FIG. 12 is a cross section taken on line 12—12 of FIG. 8.
FIG. 13 is a cross section taken on line 13—13 of FIG. 7.

Referring to FIGS. 6–13, there is shown at 71 a base having side walls 73 and 75 on which are mounted transverse brackets 77 and 79, respectively (FIG. 7). Borne in suitable bearings in the side walls 73 and 75 are a drive shaft 81 and a sprocket shaft 83. Attached to the shaft 81 is a driving sheave 85 and a gear 87, the latter meshing with a gear 89 fastened to the sprocket shaft 83. Gear 87 is driven clockwise and gear 89 anticlockwise (FIG. 6). The gear ratio between gears 87 and 89 is 1:2, so that the speed of the sprocket 83 is one-half that of shaft 81. Sheave 85 drives shaft 81 at 720 r.p.m., for example, thus making 360 r.p.m. the speed of the shaft 83 anticlockwise.

Shaft 83 carries sprocket means 2, adapted to engage the perforations in film 4. The film 4 is guided by guide rollers 8 through a film gate 6. The pitch diameter of sprocket means 2 is such that the film 4 passes through gate 6 at 24 frames per second. The film 4 also passes over a picture phase control roller 10, supported on a suitable swinging arm 12, held at 14 to the wall 75. At 16 is shown a lens having a relatively large focal distance adapted to be adjusted in guides 22. This lens 16 by suitable adjustment in the guides 22 directs the rays of the beam 18 after passing through the gate 6, so that the apparent size of the frame passing through the gate is always the same, regardless of film shrinkage or expansion according to prevailing atmospheric conditions. At 20 is shown an inverting projection lens for receiving the corrected beam after deflection of the same by means to be described.

Shaft 81 also carries a gear 91 (FIG. 7) which meshes with a gear 93 on a shaft 95, supported in bearings 97 in the brackets 77 and 79. The gear ratio between gears 91 and 93 is 1:4, making the speed 90 r.p.m. of shaft 95 anticlockwise for the case of sixteen angle mirrors. Shaft 95, by means to be described below, drives a mirror assembly indexed generally as 99 and shown separately in FIG. 8. This mirror assembly 99 corresponds generally to the rigid assembly of sixteen angle mirrors shown in the FIGS. 3–5 form of the invention. However, the assembly 99 is made up of two interdigitated annular subassemblies, each carrying eight angle mirrors. These assemblies are lettered M–1 and M–2.

Each assembly M–1, M–2 includes a hub 101 which has an abutment with respect to the other hub 101 at a thrust bearing shown diagrammatically at 103. Each hub carries a set of eight axially disposed, U-shaped extension fingers 105 which interdigitate oppositely. Each finger 105 supports spaced lugs 107, carrying between them axially directed supporting pins 109 for 45° angled mirrors 111 of the type above described. In each mirror the dihedral line such as 7 is on the axis of the respective pin 109. Thus eight angled mirrors 111 are pivotally mounted on each hub 101, all the interdigitated mirrors lying in a common plane, as will be apparent from FIG. 7. The widths of the mirrors are on the order slightly more than the widths of picture frames on the film 4. The outside surfaces 113 of the mirrors are so formed that their outer margins 115 are in sliding engagement (see FIGS. 6 and 8). This permits certain required relative motions between the two sets of eight mirrors each, in the manner to be described.

One purpose is to cause the trajectory of each dihedral line 7 at the center of each pin 109 to be a straight line 7—7'; another to cause center 7 to have constant velocity along the line 7—7'. This is accomplished (FIG. 7) by mounting a tubular extension 117 of assembly M–1 in a bearing 119 of a cam follower arm 121 and also mounting a tubular extension 123 of assembly M–2 in a bearing 125 of a second cam follower arm 127. Tubular extension 117 passes with considerable clearance through an opening 129 of side plate 75. Tubular extension 123 passes with considerable clearance through an opening 131 of the side plate 73. These conditions allow spaces for certain oscillatory movements relative to one another of assemblies M–1, M–2 as they turn, as will be detailed below.

The cam followers 121 and 127 have eye portions 133 containing said bearings 119 and 125 respectively and providing means for mounting thrust bearings 135 and 137 between them and the respective walls 75 and 73. Each cam follower 121 and 127 is pivoted at point 139 to a bridle link 141. The bridle links 141 are pivoted to the side walls 73 and 75 by means of a crosspin 143. Only one bridle link is shown at 141 in FIG. 6 and portions of each in FIG. 7, for clarification being broken away in the latter figure.

As will be shown below, the followers 121 and 127 carry means engaging certain cams for establishing relative oscillatory motions of the interdigitated rotating mirror assemblies M–1 and M–2, in order to obtain the desired accurate movements along lines 7—7'. Before describing this arrangement, certain driving means between the shaft 95 and the assemblies M–1 and M–2, which will accommodate these oscillatory movements, will be described. This driving arrangement is in the nature of a branched universal drive from the shaft 95 to said units M–1 and M–2, being as follows (FIGS. 7, 9, 10 and 11):

Numeral 145 indicates a rockable tube in which is a central opening 147 loosely receiving the end of a driving pin 149, carried crosswise in the shaft 95. The loose connection permits the required conical rocking of tube 145 while it is being driven from shaft 95. At 151 are shown collars on opposite ends of the rockable tube 145, being held in position by means of screw fasteners 155 (FIGS. 9 and 10).

Screw pins 157, threaded into collar 153 at the left-hand end of tube 145 (FIG. 10), form a rocking coupling between tube 145 and a ring 159, on which is located a second ring 161. The rings 159 and 161 are adapted to be relatively angularly adjusted by means of an adjusting screw 163. The screw is adapted angularly to adjust actuating fingers 165, one of which is attached to outer ring 161 and the other of which passes through an opening 167 in the outer ring 161 and is attached to the inner ring 159. At 90° to the axis of pins 157 is a second set of screw pins 169, threaded into tubular extension 123 of mirror assembly M–2. Thus there is in effect a universal-joint type of coupling between the left-hand end of the rockable tube 145 and the extension 123 of mirror assembly M–2.

The right-hand end of tube 145 is likewise connected by means of a universal coupling to the extension 117 of mirror assembly M–1. In detail, this consists of another set of pins 155 attaching the right-hand collar 151 to the right-hand end of tube 145 (FIG. 9). Another set of screw pins 157, threaded into the right-hand collar 151, pass through a second right-hand ring 159, around which is attached a right-hand ring 161. Rings 159 and 161 are connected with the right-hand end of extension 117 by a second set of pins 169. Thus there is in effect a second universal-joint type of coupling between the right-hand end of the rockable tube 145 and the extension 117 of mirror assembly M–1. It will be understood, in the case of both universal joint couplings described, that if desired the planes of the pins therein respectively may be coincident.

In view of the above, it will be apparent that shaft 95 drives tube 145 at its center through pin 149, and that the tube 145 provides branched driving means to the tube extensions 117 and 123, there being in effect a universal-joint type of coupling between each end of the tube 145 and the respective tube extension 117 and 123. This tube 145 while driving may rock conically in any plane required by the relative oscillatory actions imposed upon mirror assemblies M–1 and M–2. The rotating tube extensions 117 and 123 are given oscillatory plane movements with respect to one another by means of the cam followers 121 and 127. The actions of these followers will now be described in connection with FIGS. 6, 7 and 13.

Each follower 121 and 127 carries a pivot pin 171. Each pivot pin 171 on one side supports a bell crank 173, held in properly adjusted rigid position by means of an adjusting screw device 175. Each bell crank 173 supports a follower roller 177. Each roller rides one of a pair of cams 179, driven by the shaft 81. Thus the cams 179 respectively tend to drive the followers 177 and 121 back and forth generally along their lengths in the general direction shown by the darts X in FIGS. 6 and 13. The two cams 179, although identical in form, are positioned at a 180° phase angle with respect to one another on the shaft 81, as is apparent by comparing FIGS. 6 and 13. In FIG. 6 the respective roller 177 is shown in a low position, and in FIG. 13 the other roller 177 is shown in a high position. The dart X in FIG. 6 points upward to indicate that the respective roller 177 controlling follower arm 127 is rising. The dart X in FIG. 13 points downward to indicate that the respective follower roller 177 controlling follower arm 121 is dropping. The result is that the mirror assemblies M–1 and M–2 have a component of relative motion in the nature of opposite reciprocations indicated by said darts X in FIGS. 6 and 13.

Another pair of cams 181 is attached to shaft 81, one for each follower 121 and 127. These drive rollers 183 attached to extensions 185 supported on the opposite sides of pins 171. Extensions 185 are adjusted to proper positions by means of additional adjusting screw devices 175 respectively. Cams 181 are identical but phased 180° relatively to one another on shaft 81. One roller 183 controls the movement of followers 127 in the general direction of dart Y on FIG. 6. The other roller 183 controls the movement of follower 121, as indicated by dart Y on FIG. 13. The dart Y in FIG. 6 points up because the respective roller 183 is on a rise of the respective cam 181. Dart Y in FIG. 13 points down because the respective roller 183 is dropping on the respective cam 181. Thus a second swinging component of movement is applied to mirror assemblies M–1 and M–2. This component is caused by opposed scissor movements of followers 127 and 121 in direction shown by the upwardly pointing dart Y in FIG. 6 and downwardly pointing dart Y in FIG. 13. A complete period of the resultant relative oscillatory movements between mirror assemblies M–1 and M–2 is accomplished over 22½° of angular movements of the mirror assemblies. Thus as a dihedral line 7 of each angle mirror reaches the straight-line trajectory 7—7', it follows the same, due to what may be referred to as the X movements provided by cams 179. A movement of 22½° brings the dihedral line 7 from an extreme outward position 7 on line 7—7' to a mid position, and the next 22½° of movement brings this line from this mid position to its other extreme outward position 7' on the line 7—7'. What may be referred to as the relative Y movements provided by cams 181 cause the traverse of point 7 along line 7—7' to be at a constant velocity.

Reference has been made above to the action of the adjustment of lens 16 to the apparent size of the frame in the film 4 passing gate 6. By this adjustment, the apparent length of the trajectory of the film in beam 18 may be maintained constant. Thus a constant ratio of the length 7—7' to the length of the apparent trajectory of a point across gate 6 is maintained for all amounts of film shrinkage or expansion. As regards the general operation of the FIGS. 6–13 form, it is like that of FIGS. 1–5 above described and requires no repetition. Its advantages have been sufficiently stated.

While the above detailed description concerns a projection machine employing the invention, it will be understood that the arrangement is also useful for cameras. Thus, for example, referring to FIG. 3, the light system 43, 45, 49 may be removed and the film strip 27 passing through the gate 29 may be constituted by unexposed film. In this case the lens 53 will be used as a taking lens receiving light from a subject and converting it into a beam operated upon by the rotating mirror system to reflect the beam to the gate 29. The result will be that successive complete picture frames will be exposed on the passing film in serial array, ready for subsequent development, fixing, washing and drying for use in projection apparatus such as described. However, certain advantages accrue for projection in the case of use in cameras, such as to extend the exposure time to the total time required to change the film frames.

The term dihedral line as used herein is defined as a line of intersection of the reflecting planes of the two surfaces of the angle mirrors. These planes at the intersection may either be the physical mirror surfaces themselves or extensions thereof.

While, as above mentioned, angle mirrors of other than 45° included angles may be used, the included angle M of 45° is preferable because it involves a 90° reflection angle D (FIGS. 1 and 2). With this reflection angle the line 7—7' will, as shown, preferably be disposed at 45° with respect to the axial center line of lenses (such as 53 or 20) and to a line drawn normal to the plane of the film gate (such as 29 or 6). This arrangement provides for admittance to the angle mirrors as they successively pass the region of reflection of a maximum beam cross section.

In the above description concerning the structure shown in FIGS. 6 and 7, the weight of the parts associated with the cam follower arms 121 and 127 is relied upon for maintaining the rollers 177 and 183 against the cams 179 and 181. When the weight of these parts are not sufficient to maintain the desired contact at the speeds at which it is desired to operate the machine, approprite spring or like means are employed for maintaining the contact, as is well known to those skilled in the art.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. Motion picture apparatus comprising a series of angle mirrors, each angle mirror having a dihedral line, means individually pivotally supporting the mirrors, and rotary means adapted to move the pivoted mirrors sequentially over a path wherein their dihedral lines progress continuously through positions along a curve and along a substantially straight line, whereby the mirrors during traverse along said straight line will reflect one branch of a light beam into another branch thereof, means adapted to pivot said mirrors as their dihedral lines under rotation traverse said curve and said straight line, a film gate located transverse to one branch, lens means having an axis located on the other branch, means adapted to move a strip of film continuously through the gate, and means adapted to maintain substantially constant the ratio of the speed of said dihedral lines along said substantially straight line and of the film through the gate.

2. Motion picture apparatus according to claim 1, wherein the last-mentioned speeds are individually constant.

3. Motion picture apparatus comprising a film gate, means adapted to move a strip of film through said gate at a substantially constant speed, a lens having an axis directed transversely to a line positioned substantially normally to the gate, means located in respect to the lens and the gate adapted to reflect a light beam from one or the other of said lens or film and reflect it into the other, said reflecting means comprising a series of angle mirrors having dihedral lines, marginal means adapted to move said mirrors in a closed path, the dihedral lines of the mirrors in one portion of said path moving at a substantially constant rate along a substantially straight-line trajectory angled both with respect to said axis and said normal line and in other portions of the path moving curvilinearly, said mirrors having relatively movable marginal abutments adapted for relative movements between mirrors during transitional movements of the dihedral lines throughout the straight-line and curvilinear parts of the path, whereby the reflecting surfaces of the mirrors are sequentially presented during said movement of the dihedral lines along said substantially straight-line trajectory to reflect said light beam, each abutment moving across the beam at a substantially constant rate in a period of time required for a given point on the film to pass at constant speed through the film gate.

4. Motion picture apparatus comprising a film gate, means adapted to move a strip of film through said gate at a substantially constant speed, a lens, reflecting means adapted to direct a light beam from a branch thereof from the gate substantially normally to the gate into a transverse branch through said lens, said reflecting means comprising a series of angle mirrors having dihedral lines and slidable marginal contact portions between the members of the series and movable through the region of intersection of the branches of the beam, said dihedral lines moving through a curved path and at a substantially constant rate through said region along a substantially straight-line path which is angled with respect to both of said branches of the beam, said slidable marginal contact portions moving relatively as the dihedral lines move to and from said substantially straight-line path, whereby the reflecting surfaces of the mirrors are sequentially presented during said movement along said trajectory to reflect said light beam, and the abutments movably intercept the beam substantially imperceptibly in a period of time required for a given point on the film to pass at constant speed through the film gate.

5. Motion picture apparatus according to claim 4, wherein each slidable marginal contract portion while it crosses the beam maintains substantial registry with plane portions of the beam corresponding to a transverse portion on the film between pictures thereon.

6. Motion picture apparatus comprising a film gate, means adapted to move a strip of film through said gate at a substantially constant speed, a lens having an axis directed transversely to a line located substantially normally to the gate, means located in respect to the lens and the gate adapted to reflect a light beam from one or the other of said lens or film and reflect it into the other, said reflecting means comprising substantially constant-speed rotary means carrying a series of angle mirrors having dihedral lines and mutually supporting movable marginal abutments between the members of the series, said rotary means being adapted to move the dihedral lines in a curved path and also substantially along a straight-line trajectory angled both with respect to said axis and said normal line, said movable abutments permitting relative sliding movement of the mirrors at said abutments as the dihedral lines move between the curved path and the straight-line trajectory, whereby the reflecting surfaces of the mirrors are sequentially presented during said movement along said trajectory to reflect said light beam.

7. Motion picture apparatus comprising a film gate, means adapted to move a strip of film through said gate at substantially constant speed, a member rotatable at a constant speed, a series of angle mirrors attached peripherally to said rotatable member, said mirrors having relatively movable margins abutting one another in slidable contact adapted to pass through a region of approximately 90° reflection by the mirrors of a beam normal to the gate, said mirrors having dihedral lines adapted to move along a curved path and at a substantially constant speed along a straight line trajectory connected therewith, said trajectory being located at a 45° angle with respect to the direction of said beam, said margins sliding relatively when said dihedral lines move between the curved path and said trajectory.

8. Motion picture apparatus comprising first and second substantially equally rotating means, interdigitated groups of angle mirrors respectively carried by said rotating means, a film gate and lens means, said mirrors being movable through a trajectory with respect to said gate and said lens means to reflect a beam between them, and means adapted to move film through the gate and to rotate said rotating means at a substantially constant ratio of speeds.

9. Motion picture apparatus according to claim 8, and including means adapted to move a strip of film at a substantially constant speed through said gate, means adapted relatively to oscillate said first and second means as they rotate to move predetermined points on the angle mirrors substantially along a straight line angled to the plane of the gate.

10. Motion picture apparatus comprising first and second equally rotating means, interdigitated groups of angle mirrors respectively carried by said rotating means, a film gate and lens means, said mirrors being movable through a trajectory with respect to said gate and said lens means to reflect a beam between them, means adapted to move film through the gate and to rotate said rotating means at a substantially constant ratio of speeds, each group of mirrors having dihedral lines movable through independent paths, means adapted relatively to oscillate said first and second rotating means whereby parts of said paths are coincident and substantially straight and motions of said lines along said coincident straight path are constant during the times that the respective mirrors reflect the beam.

11. Motion picture apparatus according to claim 10, wherein the speeds of said equally rotating means and of said film through the gate are individually constant.

12. Motion picture apparatus comprising an assembly composed of two subassemblies peripherally supporting interdigitated groups of angle mirrors, opposite drive means on the subassemblies, a rockable tube passing through the subassemblies and their drive means, a drive shaft passing through said rockable tube, an intermediate driving connection between said shaft and tube, and universal-joint couplings between transverse ends of said tube and said drive means respectively.

13. Motion picture apparatus according to claim 12, including control means adapted to move said assemblies relatively to one another in an oscillatory manner while being rotated.

14. Motion picture apparatus according to claim 12, including cam-operated control means adapted to move said assemblies relatively to one another while being rotated.

15. In motion picture apparatus, an assembly composed of two annular subassemblies peripherally supporting interdigitated groups of angle mirrors, opposite driving means on said subassembles, rockable means passing through the subassemblies, a drive shaft extending into the subassemblies along said rockable means, a rotary driving connection between said shaft and an intermediate portion of the rockable means, and universal coupling means connecting said rockable means and said subassemblies.

16. In motion picture apparatus, a rotatable assembly composed of two annular subassemblies peripherally supporting interdigitated groups of angle mirrors, opposite driving means on said subassemblies rockable means passing through the subassemblies, a rotatable drive shaft extending into the subassemblies along said rockable means, a rotary driving connection between said shaft and an intermediate portion of the rockable means, universal couplings connecting ends of said rockable means and said opposite driving means adapted to transmit rotary motion to the subassemblies, movable means supporting the subassemblies respectively for relative movements in addition to their rotary movements, and means adapted to move said supporting means relatively.

17. Motion picture apparatus according to claim 16, wherein said last-named means are cams.

18. Motion picture apparatus according to claim 17, wherein the cams are adapted to drive the supporting means through oppositely phased movements.

19. In motion picture apparatus, a rotatable assembly composed of two annular subassemblies peripherally supporting interdigitated groups of angle mirrors pivoted thereto, the margins of which abut, opposite driving sleeves extending from said subassemblies, a rockable tube passing through the subassemblies and said opposite driving sleeves, a rotatable drive shaft extending through the rockable tube, universal couplings connecting the ends of said rockable tube and the ends of said sleeves, a driving connection between the shaft and said tube located centrally with respect to said universal couplings adapted to transmit rotary motion to the subassemblies, movable means rotatably supporting said sleeves respectively for rotations of said subassembles and for additional relative movements thereof, and cam means adapted to drive said movable supporting means in oppositely phased relationships.

20. Motion picture apparatus according to claim 19, wherein each of said movable means supporting a sleeve comprises a follower for one of the cam means, and a bridle link pivoted to each follower.

21. Motion picture apparatus comprising a rotatable assembly composed of two subassemblies peripherally supporting pivoted interdigitated groups of angle mirrors along dihedral lines thereof, the margins of said mirrors abutting, universal coupling means between said subassemblies, means adapted to rotate said subassemblies through said universal coupling means whereby said subassemblies are turned substantially equiangularly, relatively movable means supporting said subassemblies for relative movements in addition to their angular movement, drive means for said movable supporting means adapted for relative motions of the subassemblies, wherein said dihedral lines will assume substantially constant and straight-line movements throughout portions of their paths, said angle mirrors during said motions along said paths being adapted to reflect one branch of a light beam into another branch thereof, a film gate located transverse to one branch of the beam, lens means having an axis located on the other branch of the beam, and means adapted to move a strip of film at a constant velocity through the gate.

22. Motion picture apparatus according to claim 21, including a lens located in the light beam and between said gate and the region in which said mirrors reflect the beam.

References Cited in the file of this patent

UNITED STATES PATENTS

| | | |
|---|---|---|
| 1,252,321 | Comstock | Jan. 1, 1918 |
| 1,937,378 | Alexanderson | Nov. 28, 1933 |
| 2,718,549 | Mattke | Sept. 20, 1955 |

FOREIGN PATENTS

| | | |
|---|---|---|
| 96,120 | Austria | Feb. 25, 1924 |